United States Patent [19]

Martinez

[11] Patent Number: 4,513,415
[45] Date of Patent: Apr. 23, 1985

[54] BROADCAST SYNCHRONIZATION AND SUPERVISION SYSTEM

[75] Inventor: Louis Martinez, Carson, Calif.

[73] Assignee: McGraw-Edison Company, Rolling Meadows, Ill.

[21] Appl. No.: 363,613

[22] Filed: Mar. 30, 1982

Related U.S. Application Data

[63] Continuation-in-part of Ser. No. 87,543, Oct. 23, 1979, Pat. No. 4,322,842.

[51] Int. Cl.³ ............................ H04J 3/06; H04J 3/12
[52] U.S. Cl. .................................. 370/92; 179/2 EB;
455/53; 455/56; 340/825.62
[58] Field of Search ........................... 370/92, 93, 100;
179/2 DP, 2 EB, 6.16, 90 B; 455/33, 56, 53;
340/825.62

[56] References Cited

U.S. PATENT DOCUMENTS

| 3,588,371 | 6/1969 | Dal Monte | 455/33 |
|---|---|---|---|
| 3,663,762 | 5/1972 | Joel, Jr. | 455/33 |
| 3,846,783 | 11/1974 | Apsell et al. | 455/38 |
| 3,906,166 | 9/1975 | Cooper et al. | 179/2 EB |
| 4,072,824 | 2/1978 | Phillips | 179/90 B |
| 4,110,743 | 8/1978 | Zahnd | 340/825.62 |
| 4,199,761 | 4/1980 | Whyte et al. | 340/825.74 |
| 4,379,947 | 4/1983 | Warner | 370/11 |

Primary Examiner—Douglas W. Olms
Assistant Examiner—Frank M. Scutch, III
Attorney, Agent, or Firm—Blakely, Sokoloff, Taylor & Zafman

[57] ABSTRACT

A system is disclosed which employs existing broadcast stations to transmit synchronizing and supervisory signals for use by telephone communication devices at remote locations for timing purposes and for coordinating their activities with activities at other locations. The system comprises a broadcast transmitter modified to transmit phase (or frequency) modulated digital signals, which digital signals are synchronized to the carrier of the broadcast station. The broadcast station includes equipment to both periodically transmit synchronizing and supervising signals to coordinate activity of remote devices, and to transmit messages to them. The messages are generated at a central computer location and conveyed to the broadcast station by a dedicated phone line, a microwave link, or other known methods. At remote locations a TELRAD modem includes a radio receiver to detect the broadcast signals which synchronize and supervise them and associated customer apparatus. A central control computer generates the messages. Communications to and from remote monitoring locations is also accomplished. Another important object is to provide broadcast transmissions from more than one broadcast station by providing a receiver at secondary broadcast stations tuned to the primary master transmitter, which receiver detects the transmissions of the master transmitter, modulates the repeater transmitter in the prescribed manner and retransmits the signal to extend the service area.

56 Claims, 3 Drawing Figures

BROADCAST SYNCHRONIZATION & SUPERVISION SYSTEM

FIG. 1   BROADCAST SYNCHRONIZATION & SUPERVISION SYSTEM

FIG. 2 TELRAD MODEM

FIG. 3 SUBCARRIER MODULATOR-DEMODULATOR

BROADCAST SYNCHRONIZATION AND SUPERVISION SYSTEM

CROSS-REFERENCE TO RELATED APPLICATIONS

This application is a continuation-in-part of my U.S. patent application No. 87,543, now U.S. Pat. No. 4,322,842, titled, "Broadcast System for Distribution Automation and Remote Metering", filed Oct. 23, 1979 and assigned to the assignee of the present invention. Reference is also made to my previous U.S. Pat. Nos. 4,117,405 and 4,208,630.

BACKGROUND OF THE INVENTION

This invention relates to data communication systems and to systems for synchronizing and supervising apparatus and devices at a plurality of remote locations. More particularly, I disclose a system which employs existing radio broadcast stations to transmit synchronizing and supervisory signals for use by apparatus and telephone communication devices at remote locations for timing purposes and for coordinating their activities with activities at other locations.

In the above identified parent application there is disclosed an improved connumication system for electric utility load management and distribution automation, and the like. That system includes a commercial AM radio broadcast station as the principal means of communicating digital signals to remote locations for the purpose of controlling electrical loads to minimize power demand during critical heavy use periods and to control devices which improve the efficiency of the electrical distribution system. The digital signals are superimposed upon the existing voice transmissions of the broadcast station in a non interfering manner. In the invention disclosed herein that system is extended to include synchronization and supervision of telephone networks, and the like, using what the inventor calls a "TELRAD" modem (acronym for Telephone-Radio). The TELRAD modem includes a radio receiver tuned to the broadcast station, circuits for generating subcarrier signals for transmission of data over the phone lines such as the existing dial-up network, and the corresponding circuits for detecting and demodulating said subcarriers.

A principal distinguishing feature of this system is incorporation of an independent communication media (i.e., the broadcast signal) to a multiplicity of remote locations as well as the existing phone lines and this permits supervision of the primary communication media (the telephone). More specifically, the broadcast signal sets up telephone links by first communicating a precursor "seize telephone line" command, whereupon the remote device prepares to receive an incoming call. When the ring signal commences, it quickly seizes the telephone line and suppresses the ring to establish a communication path without alerting or disturbing people at the remote location. In addition, the broadcast signal continuously synchronizes digital bit streams, message frames, and other activities at the plurality of remote locations and this simplifies equipment design, increases reliability, and reduces cost of TELRAD modems.

SUMMARY OF THE INVENTION

The present invention expands applications for existing commercial broadcast stations (AM, FM, TV, or other stations whose radio carrier is continuously on) so that they may be employed for uses beyond those for which they were originally constructed. Such auxiliary uses include the management of the electrical loads at residential, commercial, industrial and other locations to minimize electrical demand at critical times of the year, or to control devices on the electrical distribution system which improve efficiency of electrical distribution. Other applications include control of traffic control lights, office machines, alterable information displays (e.g., road signs), and the like.

In the invention described herein the broadcast station supervises and synchronizes the activities of other communication devices, such as telephone systems, to extend their usefulness and to permit them to carry out tasks heretofor not practical.

These and other objectives of this invention are accomplished by transmitting signals over existing broadcast stations, such as commercial AM broadcast stations, by superimposing digital signals upon them in a non-interferring manner. Specifically, a synchronized quadrature modulation method is disclosed in the parent application No. 87,543. This is a method to phase modulate the carrier of an AM broadcast station with a digital signal in a manner wherein the digital signal bit rate (i.e., the digital clock) is derived by frequency dividing the carrier frequency of the broadcast station. This digital clock frequency can be precisely synthesized at the remote locations simply by using a phase-lock loop receiver, or the like, which locks on to the carrier frequency of the broadcast station and frequency divides this carrier to develop the digital clock frequency. Thus the digital clock frequency and other frequency and time intervals can be synthesized from the carrier frequency of the broadcast station and its special transmissions. Since the broadcast carrier signal is on continuously, precise frequency and time determination at remote locations is guaranteed.

I have disclosed an analogous method using an inaudible subcarrier on an FM broadcast station in another co-pending application. In accordance with that application the FM subcarrier serves the same function as the carrier of the AM station.

Each broadcast message transmission comprises, in a typical arrangement, a group of 16 bits within a "frame". Multiple frames can be sent in succession indefinitely to develop longer messages. Each transmission includes an address portion and a message portion so that only those remote devices whose address corresponds to the address portion of the given message will respond to that message. Such addressing methods are well known in the computer and digital art.

The broadcast station is equipped to periodically transmit specially coded synchronizing signals. Once synchronized, the plurality of remote devices can immediately distinguish the beginning and ending of any particular frame, thus all the digital clocks at the remote locations will all be synchronized to a common time reference. In addition, supervisory signals comprising standard digital patterns are transmitted upon command of a central computer so that the remote locations can be alerted to perform specific functions, such as seizing a telephone line, cause transmission of specific data, or performing a local machine operation, etc.

Present day telephone networks, particularly the switched network (often referred to as the "dial-up" network) suffer many problems of reliability because of noise, and because it is necessary to coordinate transmissions at sending and receiving ends. So called "Data Networks" for future automated offices suffer similar problems. Moreover, if the dial-up network is to be employed for both normal voice conversation and automated digital message transmissions, then it is important to solve such problems as preventing the phone from ringing and waking up the household, say in the middle of the night, when data is to be collected. The remote location must consequently anticipate when to expect a call. This must be done through an independent method of communication. My invention solves this problem using the broadcast signal as the independent means of altering the remote device to pick up the phone line at any arbitrary time before actual ringing commences.

An additional important function of my broadcast signal is to synchronize the digital clocks and the message frames at both the sending and receiving locations. Another function is to tell the various remote locations to initiate a call back to a central location (using an automatic dialer). Yet another object of my invention is to synthesize the subcarrier signals (these are employed to transmit digital data over phone lines) from the radio frequency carrier of the broadcast station so as to eliminate drift and provide precise frequency control to enable reliable synchronous demodulation of the subcarriers. Synchronous detection requires a local precise reference frequency and this is also generated by frequency divider means from the carrier frequency of the broadcast station. These design improvements significantly simplify design of the circuits at both the receiving and transmitting locations, reduce their cost and improve their reliability.

BRIEF DESCRIPTION OF THE DRAWINGS

These and other advantages of the present invention will become more apparent upon reading the following specification and by reference to the drawings in which.

DETAILED DESCRIPTION OF THE PREFERRED EMBODIMENT

It should be noted that the description of the embodiment described below finds particular utility in the supervision and synchronization of telephone networks. This system is equally applicable to other communication networks such as the so called "Data Networks", wherein an independent area-wide synchronizing and communication method, such as the broadcast station described herein, is necessary to coordinate its operations in unattended or automated applications.

Figure 1:
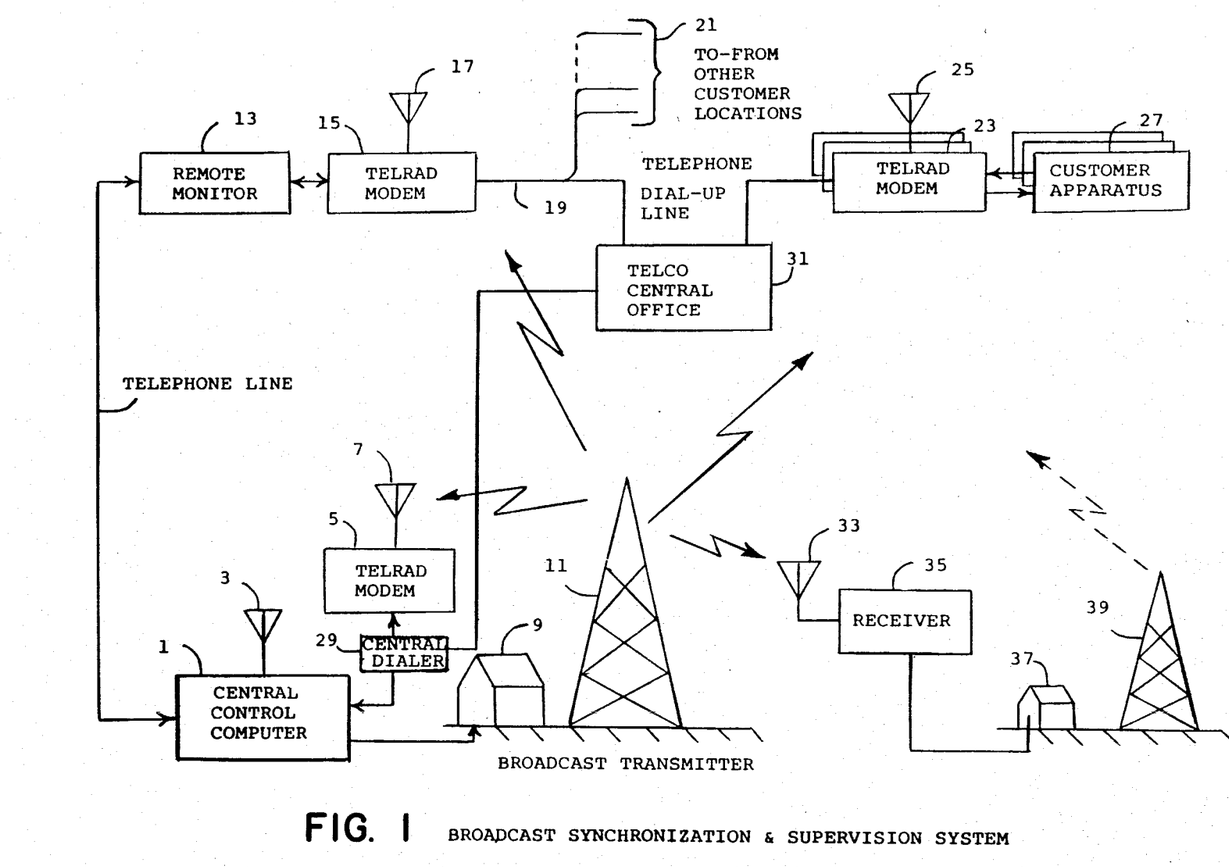
FIG. 1 is a block diagram of the overall broadcast synchronization and supervision system showing principle component parts of the system.

Referring to FIG. 1, an existing commercial broadcast station transmitter 9 generates radio signals which are radiated by antenna 11. Transmitter 9 is modified to incorporate phase modulation means which superimpose on the transmitted signal the new signals required to supervise, synchronize and transmit information to a plurality of remote devices. A particular form of modulation which is non-interferring and highly efficient has been described in detail in the parent application No. 87,543 and in previous patents awarded to this inventor. More specifically, a phase modulation method wherein a digital bit stream phase modulates the carrier of an AM broadcast station is described in the parent application. The bit streams clock is synchronized to the carrier frequency of the broadcast station by frequency divider mean. Such a phase modulator is incorporated within transmitter 9. It periodically modulates the existing transmitter in a non-interferring manner to transmit synchronizing signals (such as once each hour), so that the remote devices tuned to the broadcast signal can synchronize their digital clocks, frames, and other events. A device which this inventor calls a TELRAD modem is made a part of each remote device. The TELRAD modem includes a radio receiver tuned to the frequency of the broadcast station 9, and special circuits to detect synchronizing signals and messages.

Messages originate at central control computer 1 and these are sent to transmitter 9 via a dedicated telephone line, or other conventional communication method. A central TELRAD modem 5 detects the transmissions from the broadcast station to enable comparison of these messages with the messages generated at colocated central control computer 1 to determine if any errors exist and if so, these messages are regenerated by computer 1 and sent to transmitter 9 for retransmission.

Thus all messages which are to be sent are generated by central control computer 1. The hourly synchronizing signals are generated by special equipment at transmitter 9. These are conveyed to central control computer 1 over the telephone line between 1 and 9 and also directly over the air through antenna 3; it being understood that a receiver for this purpose can be included within computer 1. TELRAD modem 5 can also be located at central control computer 1 along with a computer controlled phone dialer 29, depending upon whether the remote devices are to communicate directly to the central control computer site via telephone lines, or to remote monitors 13, or both.

In a typical system, a plurality of TELRAD modems 23 receive synchronizing signals continuously from broadcast station 9 through their antennas 25. TELRAD modem 23 is therefore always prepared to receive supervisory signals or messages originated from central control computer 1. These messages are sent to and from associated customer apparatus 27, which apparatus might be a computer terminal, automated office equipment, load management devices, or an electric utility power meter as may be necessary for remote meter reading applications, and the like.

TELRAD modem 15 detects the signals from broadcast station 9 through its antenna 17 and this modem may be connected to a remote monitor, such as a small minicomputer with CRT display, so that information from customer apparatus such as power meter readings can be collected and recorded or displayed. The object is to provide a means whereby remote monitor 13 can communicate to a plurality of customer apparatus 27 through Telco central offices 31 over ordinary phone dial-up lines 21. Establishment of this communication link and the associated synchronized data transfers is accomplished by TELRAD modem 15 and 23. These devices are in turn synchronized and supervised by signals from broadcast station 9.

Another important feature illustrated in FIG. 1 is provision of a "repeater broadcast station" 37 and its associated antenna 39. This repeater station includes a receiver 35 which detects the signals transmitted from broadcast station 9 through antenna 33 and subsequently modulates transmitter 37 in the same manner as central control computer 1 modulates transmitter 9. Obviously a phone line between computer 1 and transmitter 37 could also be used. Thus transmitter 37 can repeat signals in its local area and thereby extend the area covered. The TELRAD modem locks to and detects only signals from the stronger of the two or more broadcast stations.

Central dialer 29 and remote monitor 13 can communicate with a plurality of TELRAD modems 23 through a multiplicity of phone lines 21. TELRAD modem 5 and 15 are functionally identical to TELRAD modem 23, however, they include a plurality of parallel circuits and/or switching means to permit them to communicate simultaneously with many customer apparatus 27 through their companion TELRAD modems 23.

Figure 2:
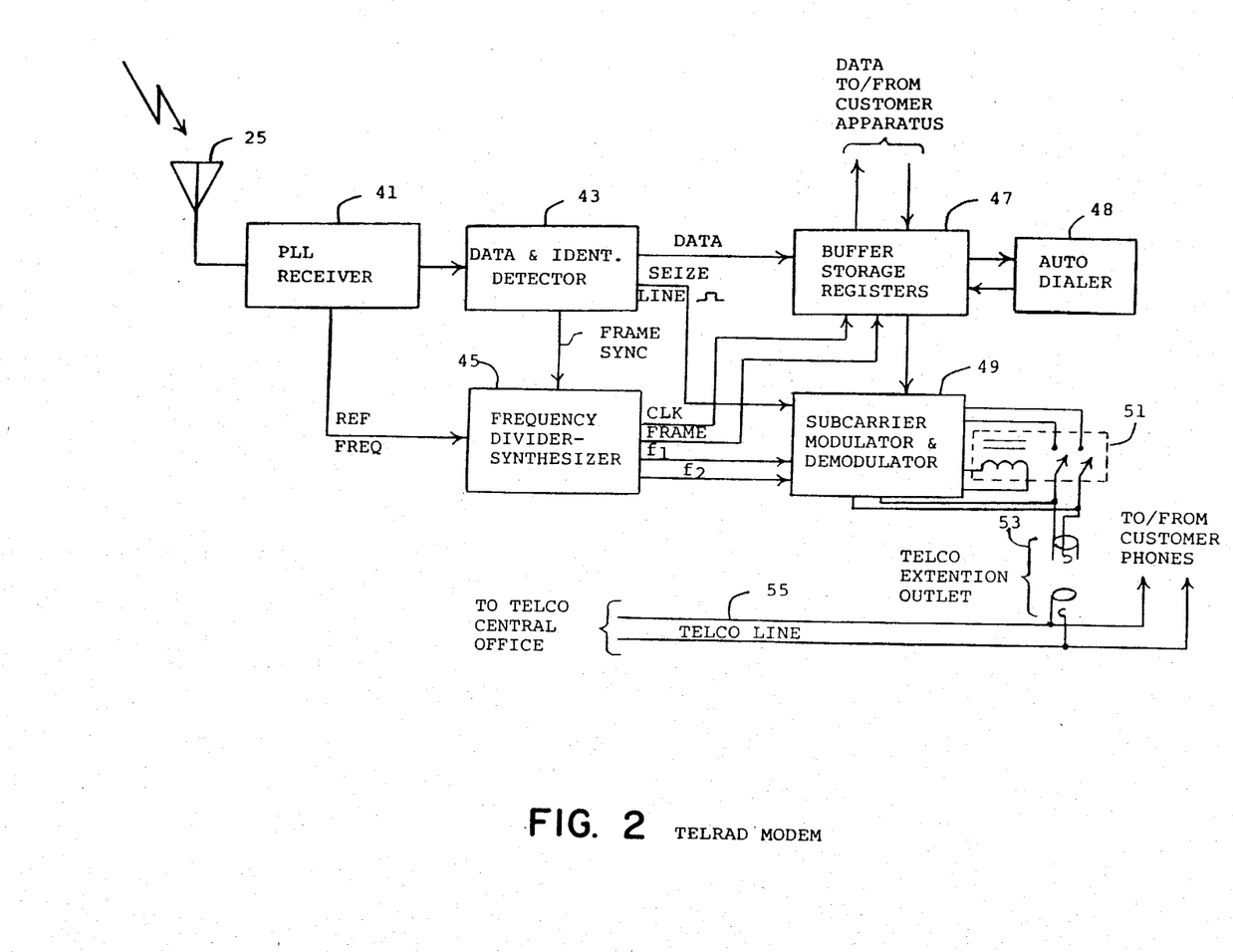
FIG. 2 is a block diagram of the TELRAD modem showing its interconnection to the telephone (telco) line.

FIG. 2 is a block diagram of a typical TELRAD modem. This represents one particular embodiment of my invention. Antenna 25 picks up signals from broadcast station 9 and connects them to a phase-lock loop (PLL) receiver 41. Receiver 41 may be one of several designs discussed in detail in the parent application number 87,543 and it suffices to point out at this point that this receiver detects the digital information sent by transmitter 9 and also generates one or more reference frequencies precisely synchronized to the carrier of the broadcast station by frequency dividing the carrier of the broadcast station. Data & Identification Detector 43 reads these messages to determine if the identification code corresponds to the code of that particular detector, and if so, it proceeds to read the remaining message and act upon it. Frequency divider-synthesizer 45 takes the reference frequency from receiver 41 and synthesizes from it the following: a digital clock, message frame intervals, and subcarrier frequencies $f_1$ and $f_2$; all of these being precisely synchronized to the reference frequency from 41. Detector 43 also searches for and detects the periodic hourly frame synchronizing signal from the broadcast station and sends it to synthesizer 45; this makes all outputs from synthesizer 45 fall into synchronism with the broadcast signals. A detailed discussion of the manner in which the synchronization is accomplished is set forth in the aforesaid parent application and patents. Detector 43 outputs the messages to buffer storage registers 47 where it is clocked to/from customer apparatus in synchronism with the clock signal from synthesizer 45 and ground in message frames also provided by synthesizer 45. This is a very important function because it eliminates the necessity to provide start and stop bits with each message transmission and eliminates the associated "overhead" traffic created by such transmissions. This type of data transmission is referred to as synchronized, as opposed to the more common asynchronous systems. This is a significant improvement over existing systems and adds reliability.

Detector 43 also generates a "seize line" signal and sends it to the modulator & demodulator 49 which in turn actuates line seizing relay 51 to connect 49 to the telco line 55. When a telephone link is to be established between a sending central device 1 and a remote location 27, a broadcast transmission is initiated including the address of the distant TELRAD modem 23; this is detected by 43 which sends a line seize signal to 49 which in turn seizes the phone line through relay 51. This is done immediately upon sensing a "ring" signal, but prior to actual ringing of the local telephone. Obviously, if a dedicated telephone line is employed in my system, a ring detector and ring suppression circuit is not necessary.

Subcarrier modulator & demodulator 49 selects an audio tone at either frequency $f_1$ or $f_2$ depending upon whether a digital logic 0 to 1 is to be transmitted. Tones $f_1$ and $f_2$ are precisely synthesized from the broadcast carrier frequency by synthesizer 45 and these frequencies are known precisely at the sending location as well as at the receiving location; that is highly desirable for synchronous signal demodulation. Signals at $f_1$ and $f_2$ are known as subcarriers and this method is called FSK (frequency shift keying). Typical frequencies might be 1100 Hz for $f_1$ and 1300 Hz for $f_2$. These tones are in the audible range and easily pass through the telephone dial-up network. The FSK process could be at 300 baud, for example.

The telco modem shown in FIG. 2 may be connected to the telephone line 55 through a standard telco extension outlet 53, available to most telephone subscribers. Normally, line seizing relay 51 is in the open condition and therefore does not effect conventional use of the local telephones. Since most data message transmissions between central locations and the customer apparatus can be conveyed within one or two minutes, actuation of line seizing relay 51 should not pose a problem to normal telephone use. Upon receipt of a supervisory command, or at a prescribed point in time, auto dialer 48 can be programmed to initiate a call to a central location, or to another TELRAD modem.

Figure 3:
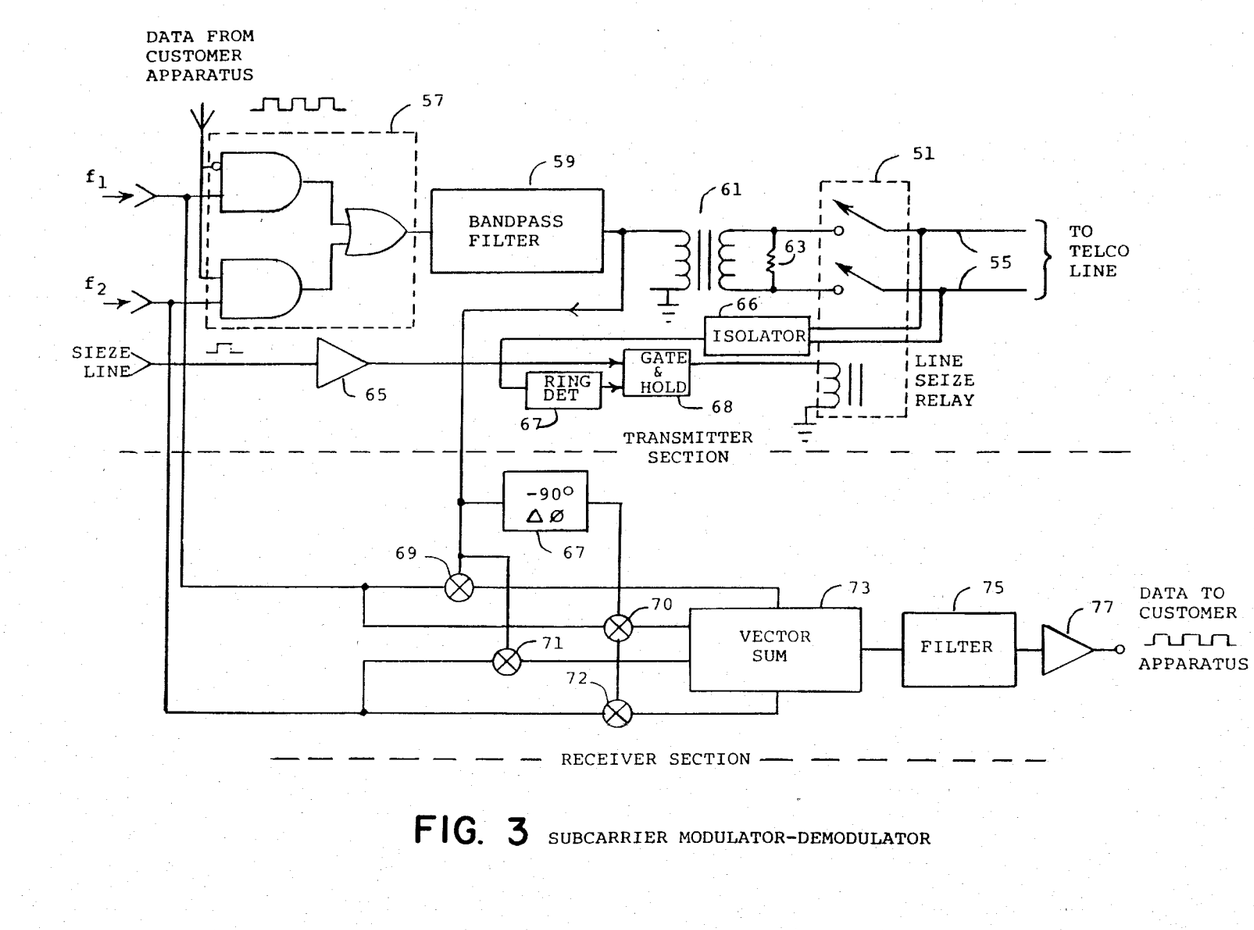
FIG. 3 is a schematic and block diagram of one specific embodiment of the subcarrier modulator & demodulator.

FIG. 3 is a schematic and block diagram of subcarrier modulator & demodulator 49 and illustrates one method by which digital data from buffer 47 is passed to and from telephone line 55. Tone frequencies $f_1$ and $f_2$ are sent to the digital circuit 57 which in turn passes either signal $f_1$ or $f_2$ to bandpass filter 59, dpending upon whether a digital logic 0 or logic 1 is to be transmitted. For example, frequency $f_1$ can be selected for a logic 0 and $f_2$ for a logic 1. Bandpass filter 59 suppresses harmonics as required by Federal Communicaitions Commission regulations. The signal from 59 is sent through isolation transformer 61 thence to telco line 55 through line relay 51. This is how subcarrier tones $f_1$ and $f_2$ convey digital information from a customer apparatus through the telephone line to a distant remote monitor 13 or central computer 1. In the receiving mode, central computer 1 causes transmission of a message over the broadcast station to a remote TELRAD modem 23 giving its address and instructions including a command to seize the telephone line. Simultaneously, Central Dialer 29 dials the desired TELRAD modem phone number. This results in a ring signal being conveyed to ring detector 67 through isolator 66 which enables logic gate 68. The presence of the seize line signal and the ring detect signal on gate 68 immediately actuates relay 51 to suppress actual bell ringing and holds the telephone line until message completion. Line terminating load 63, which may be a resister or a resister and condenser combination, helps suppress the ring signal.

I have thus described how subcarrier modulator & demodulator 49 transmits digital data over telephone lines using subcarriers and how it answers the telephone upon command from a central computer and suppresses the ring. We shall now describe one embodiment of a synchronous subcarrier detector which is employed to detect digital data from subcarriers in the receive mode.

Referring to FIG. 3, reference tones $f_1$ and $f_2$ are sent to mixers 69 through 72 from synthesizer 45. These mixtures (i.e., multipliers) also receive subcarrier tones from the telephone line through transformer 61. Either $f_1$ or $f_2$ might be received from the phone line depending upon whether a logic "0" or "1" is being transmitted at any instant. Assume, for example, that $f_1$ is being received. Mixers 69 and 70 receive a locally generated tone $f_1$ and mixers 71 and 72 receive a local tone $f_2$. Thus if tone $f_1$ is being received from the phone line, then mixers 69 and 70 will mix optimally with this incoming signal and vector sum circuit 73 will indicate a maxima in channel $f_1$. Quadrature phase shifter 67 is necessary because the phase of incoming signal $f_1$ may have an arbitrary relation to the phase of the local reference signal $f_1$ due to unknown telephone network delays and other causes. Depending upon the phase relationship between the incoming signal $f_1$ and the locally generated signal $f_1$, either mixer 69 or 70 will have a bigger signal, but the vector sum of both of these signals will generally be a constant regardless of the phase angle. A similar situation exists if the incoming signal is at frequency $f_2$. In the latter case the vector sum from mixers 71 and 72 will become a maximum and the signals from mixers 69 and 70 will be at a minimum. This subcarrier detection process is known as synchronous quadrature detection and its advantages are well known in the communication art. The significant point of novelty here is that reference tones $f_1$ and $f_2$ are synthesized from the broadcast station carrier frequency and thus are known precisely at all sending and receiving locations within the service area of the broadcast station. This is an important feature and substantially increase the reliability of signal detection even in noisy telephone channels.

It will also be evident to engineers skilled in the communications art that it is possible to code digital information on a single subcarrier tone in a manner whereby the absolute phase of the tone is made to represent a quantum of information. for example, a single subcarrier tone $f_1$ could be coded digitally in such a manner that the phase at 0° relative to a reference tone represents one bit of information, the phase at 90° represents another bit of information, and the phase at 180° and 270° represent yet other bits of information. Such a designation of four phases of each cycle of subcarrier tone is often referred to as quadraphase modulation. This is one of several known methods to transmit more information over a subcarrier then by the simple two tone FSK method described above.

Although the FSK method is not as efficient in terms of data traffic as the quadraphase method, it is simpler and cheaper to implement and generally more reliable in noisy telephone circuits. Nevertheless, quadraphase, or even more complex modulation methods may be practiced using my invention wherein it is to be understood that my point of improvement and novelty lies in the generation of a precise reference subcarrier frequency for synchronous signal demodulation, which subcarrier frequency is synthesized from the broadcast station carrier frequency. Obviously, the subcarrier frequency derived by synthesizer 45 can be split into multiple phases so as to make it useful in quadraphase demodulation and the like.

Another obvious function which the broadcast station signal can provide is synchronization of telephone multiplexers at both sending and receiving ends so that several "users" can employ one phone line simultaneously using either "time division" or "frequency division" operating modes. This is made possible by the precise time and frequency output of synthesizer 45 which is "orchestrated" by the broadcast station.

It should be understood that the preceding description sets out the preferred embodiments of the present invention according to the mandate of the patent statutes. However, many modifications of the unique concepts disclosed herein should become apparent to one skilled in the art after reading the preceeding description. Therfore, while this invention has been described in connection with particular examples thereof, no limitation is intended thereby except as defined by the appended claims.

I claim:

1. A broadcast system for enabling independent communication with a plurality of remote locations comprising broadcast station transmitter means for broadcasting normal program material central control means at a central location for generating digital address and control signals means coupled to said central control means and said broadcast station transmitter means for causing the broadcasting of said digital address and control signals with said normal program material in a manner so as to be substantially noninterfering with the reception of the normal program material a plurality of remote receivers for receiving and detecting said digital address and control signals broadcast by said broadcast station transmitter, each said receiver having a preassigned address and including address detection means for determining the coincidence between a broadcast address and the preassigned address of the respective receiver, and enabling means associated with each of said receivers and responsive to said address detecting means therein to enable the establishment of an independent bidirectional communication link between said remote location and said central location.

2. The system of claim 1 wherein said independent communication link is a serial digital data link, and wherein said system is further comprised of synchronizing means for causing said broadcast station to broadcast synchronizing signals, said remote receivers each having means for detecting said synchronizing signals, whereby said serial digital data in said independent communication link may be synchronized by said broadcast station.

3. The system of claim 2 wherein said synchronizing signals include bit synchronizing signals.

4. The system of claim 2 wherein said synchronizing signals include frame synchronizing signals.

5. The system of claim 2 wherein said synchronizing signals include periodic synchronizing signals and wherein each of said receivers include frequency divider means responsive to the normal broadcast station signal and said synchronizing signals to provide bit and frame synchronizing for communication in said independent communication link.

6. The system of claim 1 wherein said independent communication link is a telephone link.

7. A broadcast system for enabling independent communication with a plurality of remote locations comprising broadcast station transmitter means for broadcasting normal program material central control means for generating digital address and control signals means coupled to said central control means and said broadcast station for causing the broadcasting of said digital address and control signals with said normal program material in a manner so as to be substantially noninterfering with the reception of the normal program material a plurality of remote receivers for receiving and detecting said digital address and control signals broadcast by said broadcast station transmitter, each said receiver including address detection means for determining the coincidence between a broadcast address and the preassigned address of the respective receiver, each of said remote receivers each also including telephone line ring detect and automatic telephone answer means for sensing the presence of a ring signal on a telephone line and providing an off hook signal in response thereto to terminate the ring signal and establish the phone communication link, and wherein said enabling means is a means for enabling the operation of said telephone line ring detect and automatic telephone answer means, whereby said telephone line ring detect and automatic answer means will be operative only when enabled by said central control means, and enabling means associated with each of said receivers and responsive to said address detecting means therein to enable the establishment of an independent communication link with said remote location.

8. The system of claim 7 wherein said ring detect and automatic telephone answer means, when enabled, will suppress the audible ring of any telephone set on the same telephone line.

9. A broadcast system for enabling independent communication with a plurality of remote locations comprising broadcast station transmitter means for broadcasting normal program material central control means for generating digital address and control signals means coupled to said central control means and said broadcast station for causing the broadcasting of said digital address and control signals with said normal program material in a manner so as to be substantially noninterfering with the reception of the normal program material a plurality of remote receivers for receiving and detecting said digital address and control signals broadcast by said broadcast station transmitter, each said receiver including address detection means for determining the coincidence between a broadcast address and the preassigned address of the respective receiver, each of said receivers also including automatic dialing means, whereby each of said remote receivers, when enabled, may initiate the establishment of the independent communication link, and enabling means associated with each of said receivers and responsive to said address detecting means therein to enable the establishment of a telephone communication link with said remote location.

10. The system of claim 9 wherein each of said remote receivers includes coding means for receiving digital data from other apparatus at the remote location and coding said data for transmission over the phone line.

11. The system of claim 10 wherein said coding means includes a time division multiplexing means synchronized by synchronizing signals broadcast by said broadcasting station whereby multiple receivers may communicate over the same phone line in a time division multiplexed mode.

12. The system of claim 10 wherein said coding means includes modulation means for modulating said digital data.

13. The system of claim 12 wherein said modulation means is a frequency shift keying means for generating first and second frequencies dependent on the state of the digital data.

14. The system of claim 13 wherein said first and second frequencies each have a fixed and predetermined relationship with respect to the signal broadcast by said broadcast station.

15. The system of claim 14 wherein the bit and frame timing of said frequency shift keying means has a fixed and predetermined relationship with respect to the signal broadcast by said broadcast station.

16. A broadcast system for enabling independent communication with a plurality of remote locations comprising broadcast station transmitter means for broadcasting normal program material central control means for generating digital address and control signals means coupled to said central control means and said broadcast station for causing the broadcasting of said digital address and control signals with said normal program material in a manner so as to be substantially noninterfering with the reception of the normal program material a plurality of remote receivers for receiving and detecting said digital address and control signals broadcast by said broadcast station transmitter, each said receiver including address detection means for determining the coincidence between a broadcast address and the preassigned address of the respective receiver, each of said remote receivers also including decoding means for receiving digital data over a phone line and decoding said data for use at the remote location, and enabling means associated with each of said receivers and responsive to said address detecting means therein to enable the establishment of a telephone communication link with said remote location.

17. The system of claim 16 wherein said decoding means includes a time division demultiplexing means synchronized by synchronizing signals broadcast by said broadcast station whereby multiple receivers may receive data transmitted over the same phone line.

18. The system of claim 16 wherein said decoding means includes demodulation means.

19. The system of claim 18 wherein said demodulation means is a frequency shift keyed detector means for detecting first and second frequencies representing the state of the digital data.

20. The system of claim 19 wherein said first and second frequencies each have a fixed and predetermined relationship with respect to the signal broadcast by said broadcast station.

21. The system of claim 19 wherein the bit and frame timing of said frequency shift keyed detector means has a fixed and predetermined relationship with respect to the signal broadcast by said broadcast station.

22. The system of claim 20 wherein said frequency shift keyed detector means is a synchronous detector utilizing at least one reference frequency derived from said broadcast signal.

23. The system of claim 1 further comprised of a remote monitor means for selectively communication with the remote locations of said remote receivers over the independent communication link as enabled by the digital address and control signals broadcast by said broadcast station.

24. The system of claim 1 wherein said broadcast station transmitter means comprises a plurality of broadcast station transmitters whereby the geographic area of response of said remote receiver may be enlarged over that attainable by a single transmitter means.

25. The system of claim 1 wherein said broadcast station transmitter means comprises a primary broadcast station transmitter and at least one secondary transmitter including receiver means to detect signals from the primary transmitter for retransmission by said secondary transmitter whereby the geographic area of responses of said remote receiver may be enlarged over that attainable by a single transmitter means.

26. A broadcast system for enabling communication with a plurality of remote locations comprising
broadcast station transmitter means for boradcasting normal program material
central control means at a central location for generating digital address and control signals
means coupled to said central control means and said broadcast station transmitter for causing the broadcasting of said digital address and control signals with said normal program material in a manner so as to be substantially noninterfering with the reception of the normal program material
a plurality of remote receivers for receiving and detecting said digital address and control signals broadcast by said broadcast station transmitter, each said receiver having a preassigned address and including address detection means for determining the coincidence between a broadcast address and the preassigned address of the respective receiver, and
enabling means associated with each of said receivers and responsive to said adress detecting means
each of said remote receivers being coupled to a telephone line and including telephone line ring detect and automatic telephone answer means for sensing the presence of a ring signal on the telephone line and providing an off hook signal in response there to terminate the ring signal and establish a telephone line communication link between said central location and the respective said remote location, and wherein said enabling means is a means for enabling the operation of said telephone line ring detect and automatic telephone answer means, whereby said telephone line ring detect and automatic answer means will be operative only when enabled by said central control means.

27. The system of claim 26 wherein said telephone line communication links is a serial digital data link, and wherein said system is further comprised of synchronizing means for causing said broadcast station to broadcast synchronizing signals, said remote receivers each having means for detecting said synchronizing signals, whereby said serial digital data in said telephone line communication link may be synchronized by said broadcast station.

28. The system of claim 27 wherein said synchronizing signals include bit synchronizing signals.

29. The system of claim 27 wherein said synchronizing signals include frame synchronizing signals.

30. The system of claim 27 wherein said synchronizing signals include periodic synchronizing signals and wherein each of said receivers include frequency divider means responsive to the normal broadcast station signal and said synchronizing signals to provide bit and frame synchronizing for communication in said telephone line communication link.

31. The system of claim 26 wherein said ring detect and automatic telephone answer means, when enabled, will suppress the audible ring of any telephone set on the same telephone line.

32. The system of claim 26 wherein each of said receivers includes automatic dialing means, whereby each of said remote receivers may initiate the establishment of the telephone line communication link when enabled by said enabling means.

33. The system of claim 26 wherein each of said remote receivers includes coding means for receiving digital data from other apparatus at the respective remote location and coding said data for transmission over the phone line.

34. The system of claim 33 wherein said coding means includes a time division multiplexing means synchronized by synchronizing signals broadcast by said broadcasting station whereby multiple receivers may communicate over the same phone line in a time division multiplexed mode.

35. The system of claim 33 wherein said coding means includes modulation means for modulating said digital data.

36. The system of claim 35 wherein said modulation means is a frequency shift keying means for generating first and second frequencies dependent on the state of the digital data.

37. The system of claim 36 wherein said first and second frequencies each have a fixed and predetermined relationship with respect to the signal broadcast by said broadcast station.

38. The system of claim 37 wherein the bit and frame timing of said frequency shift keying means has a fixed and predetermined relationship with respect to the signal broadcast by said broadcast station.

39. The system of claim 26 wherein each of said remote receivers includes decoding means for receiving digital data over a phone line and decoding said data for use at the remote location.

40. The system of claim 39 wherein said decoding means includes a time division demultiplexing means synchronized by synchronizing signals broadcast by said broadcast station whereby multiple receivers may receive data transmitted over the same phone line.

41. The system of claim 39 wherein said decoding means includes demodulation means.

42. The system of claim 41 wherein said demodulation means is a frequency shift keyed detector means for detecting first and second frequencies representing the state of the digital data.

43. The system of claim 42 wherein said first and second frequencies each have a fixed and predetermined relationship with respect to the signal broadcast by said broadcast station.

44. The system of claim 42 wherein the bit and frame timing of said frequency shift keyed detector means has a fixed and predetermined relationship with respect to the signal broadcast by said broadcast station.

45. The system of claim 43 wherein said frequency shift keyed detector means is a synchronous detector utilizing at least one reference frequency derived from said broadcast signal.

46. The system of claim 26 further comprised of a remote monitor means for selectively communication with the remote locations of said remote receivers over the telephone line communication link as enabled by the digital address and control signals broadcast by said broadcast station.

47. The system of claim 26 wherein said broadcast station transmitter means comprises a plurality of broadcast station transmitters whereby the geographic area of response of said remote receiver may be enlarged over that attainable by a single transmitter means.

48. The system of claim 26 wherein said broadcast station transmitter means comprises a primary of broadcast station transmitter and at least one secondary transmitter including received means to detect signals from the primary transmitter for retransmission by said secondary transmitter whereby the geographic area of responses of said remote receiver may be enlarged over that attainable by a single transmitter means.

49. The system of claim 26 wherein said independent communication link is a bidirectional link.

50. A broadcast system for enabling independent communication with a plurality of remote locations comprising
broadcast station transmitter means for broadcasting normal program material
central control means at a central location for generating digital address and control signals
means coupled to said central control means and said broadcast station transmitter for causing the broadcasting of said digital address and control signals with said normal program material in a manner so as to be substantially noninterfering with the reception of the normal program material
a plurality of remote receivers for receiving and detecting said digital address and control signals broadcast by said broadcast station transmitter, each said receiver having a preassigned address and including address detection means for determining the coincidence between a broadcast address and the preassigned address of the respective receiver, and
enabling means associated with each of said receivers and responsive to said address detecting means therein to enable the establishment of a telephone line communication link between said central location and its respective said remote location,
each of said receivers including automatic dialing means, whereby each of said remote receivers may initiate the establishment of the telephone line communication link when enabled by said enabling means.

51. The system of claim 50 wherein said independent communication link is a serial digital data link, and wherein said system is further comprised of synchronizing means for causing said broadcast station to broadcast synchronizing signals, said remote receivers each having means for detecting said synchronizing signals, whereby said serial digital data in said telephone line communication link may be synchronized by said broadcast station.

52. The system of claim 51 wherein said synchronizing signals include bit synchronizing signals.

53. The system of claim 51 wherein said synchronizing signals include frame synchronizing signals.

54. The system of claim 51 wherein said synchronizing signals include periodic synchronizing signals and wherein each of said receivers include frequency divider means responsive to the normal broadcast station signal and said synchronizing signals to provide bit and frame synchronizing for communication in said telephone line communication link.

55. The system of claim 50 wherein each of said remote receivers includes coding means for receiving digital data from other apparatus at the respective remote location and coding said data for transmission over the telephone line.

56. The system of claim 50 wherein each of said remote receivers includes decoding means for receiving digital data over a phone line and decoding said data for use at the remote location.

* * * * *